US010916796B1

(12) United States Patent
Zeilinger et al.

(10) Patent No.: US 10,916,796 B1
(45) Date of Patent: Feb. 9, 2021

(54) SELECTIVE CHARGING MATRIX FOR RECHARGEABLE BATTERIES

(71) Applicant: Apple Inc., Cupertino, CA (US)

(72) Inventors: Tobias Zeilinger, Palo Alto, CA (US);
Donald G. Dafoe, San Jose, CA (US);
Paul W. Firehammer, Saline, MI (US);
Andrew C. Chu, Cupertino, CA (US);
Christopher T. Campbell, San Jose, CA (US); Mario Tippelhofer, Campbell, CA (US); Alexander A. Bondarenko, Waterloo (CA);
Qingcheng Zeng, San Jose, CA (US)

( * ) Notice: Subject to any disclaimer, the term of this patent is extended or adjusted under 35 U.S.C. 154(b) by 47 days.

(21) Appl. No.: 16/263,890

(22) Filed: Jan. 31, 2019

Related U.S. Application Data (60) Provisional application No. 62/625,610, filed on Feb. 2, 2018.

(51) Int. Cl.
*H01M 10/04* (2006.01)
*H01M 4/60* (2006.01)

(52) U.S. Cl.
CPC ......... *H01M 10/049* (2013.01); *H01M 4/602* (2013.01); *H01M 10/0459* (2013.01)

(58) Field of Classification Search
None
See application file for complete search history.

(56) References Cited

U.S. PATENT DOCUMENTS

| 4,374,186 A | * | 2/1983 | McCartney | ............. | H01M 4/66 |
| | | | | | 429/154 |
| 4,567,119 A | | 1/1986 | Lim | | |

(Continued)

FOREIGN PATENT DOCUMENTS

| CN | 101809801 A | 8/2010 |
| CN | 102272977 A | 12/2011 |

(Continued)

OTHER PUBLICATIONS

U.S. Appl. No. 16/049,250, "Non-Final Office Action", dated Apr. 8, 2020, 8 pages.

(Continued)

*Primary Examiner* — Scott J. Chmielecki
(74) *Attorney, Agent, or Firm* — Kilpatrick Townsend & Stockton (57) ABSTRACT

Energy storage devices, battery cells, and batteries may include a first current collector having an anode active material disposed along a first surface of the first current collector. The cells may include a plurality of first electrodes positioned along a second surface of the first current collector opposite the first surface. The plurality of first electrodes may be characterized by a first orientation. The cells may include a second current collector having a cathode active material disposed along a first surface of the second current collector. The cells may include a separator positioned between the anode active material and the cathode active material. The cells may also include a plurality of second electrodes positioned along a second surface of the second current collector opposite the first surface. The plurality of second electrodes may be characterized by a second orientation substantially orthogonal to the first orientation.

20 Claims, 5 Drawing Sheets

(56) References Cited

U.S. PATENT DOCUMENTS

| | | |
|---|---|---|
| 5,162,172 A | 11/1992 | Kaun |
| 5,254,415 A | 10/1993 | Williams et al. |
| 5,367,431 A | 11/1994 | Kunishi et al. |
| 8,357,469 B2 | 1/2013 | Shaffer, II et al. |
| 9,142,811 B2 | 9/2015 | Chami |
| 2002/0146620 A1 | 10/2002 | Connell |
| 2003/0027051 A1 | 2/2003 | Kehja et al. |
| 2005/0106456 A1 | 5/2005 | Puester et al. |
| 2009/0068531 A1 | 3/2009 | Sawa et al. |
| 2009/0136832 A1 | 5/2009 | Aihara et al. |
| 2009/0233175 A1 | 9/2009 | Kelley et al. |
| 2010/0134942 A1 | 6/2010 | Wang et al. |
| 2011/0294007 A1 | 12/2011 | Hosaka et al. |
| 2012/0156552 A1 | 6/2012 | Miyazaki et al. |
| 2012/0189896 A1 | 7/2012 | Zhou et al. |
| 2013/0065106 A1 | 3/2013 | Faust et al. |
| 2013/0089774 A1 | 4/2013 | Chami |
| 2015/0325894 A1 | 11/2015 | Merriman et al. |
| 2016/0049679 A1 | 2/2016 | Stevens et al. |
| 2016/0099456 A1* | 4/2016 | Kwon .......... H01M 6/46 429/94 |
| 2016/0197352 A1 | 7/2016 | Blaser et al. |
| 2016/0248113 A1 | 8/2016 | He et al. |
| 2017/0214057 A1* | 7/2017 | Kotik .......... H01M 4/78 |
| 2018/0013144 A1 | 1/2018 | Li et al. |
| 2018/0226654 A1 | 8/2018 | Ohsawa et al. |

FOREIGN PATENT DOCUMENTS

| | | |
|---|---|---|
| CN | 103165920 A | 6/2013 |
| CN | 103222098 A | 7/2013 |
| CN | 103548196 A | 1/2014 |
| CN | 103904294 A | 7/2014 |
| CN | 107851747 A | 3/2018 |
| EP | 2892097 A1 | 7/2015 |
| EP | 3317907 A | 5/2018 |
| JP | 06503442 A | 4/1994 |
| JP | 2005005163 A | 1/2005 |
| JP | 2006012556 A | 1/2006 |
| JP | 2007012584 A | 1/2007 |
| JP | 2011071011 A | 4/2011 |
| JP | 4857710 B2 | 1/2012 |
| JP | 2012234823 A | 11/2012 |
| JP | 2013114746 A | 6/2013 |
| JP | 2013187074 A | 9/2013 |
| JP | 5410822 B2 | 2/2014 |
| JP | 2014029818 A | 2/2014 |
| JP | 2018519646 | 7/2018 |
| KR | 20130066795 A | 6/2013 |
| WO | 8504287 A1 | 9/1985 |
| WO | 9210861 A1 | 6/1992 |
| WO | 2016031689 A1 | 3/2016 |
| WO | 2017007827 | 1/2017 |
| WO | 2018057566 A1 | 3/2018 |
| WO | 2018195372 A1 | 10/2018 |
| WO | 2018213601 A2 | 11/2018 |

OTHER PUBLICATIONS

U.S. Appl. No. 15/742,009, "Non-Final Office Action", dated Nov. 15, 2019, 14 pages.
PCT/US2018/033218, "International Preliminary Report on Patentability", dated Nov. 28, 2019, 9 pages.
U.S. Appl. No. 15/742,009, "Restriction Requirement", dated Jun. 11, 2019, 8 pages.
Korea Patent Application No. 10-2018-7000263, "Office Action", dated Sep. 27, 2019, 16 pages.
PCT/US2018/028472, "International Preliminary Report on Patentability", dated Oct. 31, 2019, 10 pages.
International Patent Application No. PCT/US2017/052413, "International Preliminary Report on Patentability", dated Apr. 4, 2019, 12 pages.
Europe Patent Application No. 16738994.9, "Communication Pursuant to Rules 161(1) and 162 EPC", dated Mar. 23, 2018, 3 pages.
Japan Patent Application No. 2018-500449, "Office Action", dated Jan. 21, 2019, 12 pages.
PCT/US2016/041151, "International Preliminary Report on Patentability", dated Jan. 18, 2018, 8 pages.
PCT/US2016/041151, "International Search Report and Written Opinion", dated Aug. 25 ,2016, 10 pages.
PCT/US2017/052413, "International Search Report and Written Opinion", dated Feb. 1, 2018, 19 pages.
PCT/US2017/052413, "Invitation to Pay Additional Fees", dated Dec. 8, 2017, 14 pages.
PCT/US2018/028472, "International Search Report and Written Opinion", dated Jul. 27, 2018, 13 pages.
PCT/US2018/033218, "International Search Report and Written Opinion", dated Nov. 16, 2018, 13 pages.
Korean Patent Application No. 10-2018-7000263, "Office Action", dated Feb. 28, 2019, 5 pages.
U.S. Appl. No. 16/108,498, "Non-Final Office Action", dated Apr. 30, 2020, 28 pages.
U.S. Appl. No. 16/273,625, "Non-Final Office Action", dated May 4, 2020, 54 pages.
U.S. Appl. No. 16/007,534, "Non-Final Office Action", dated May 5, 2020, 47 pages.
Chinese Patent Application No. 201680039891.9, "Office Action", dated Jan. 6, 2020, 23 pages.
U.S. Appl. No. 15/962,133, "Non-Final Office Action", dated Jan. 21, 2020, 37 pages.
U.S. Appl. No. 15/742,009, "Final Office Action", dated Aug. 19, 2020, 13 pages.
U.S. Appl. No. 16/049,250, "Notice of Allowance", dated Oct. 7, 2020, 7 pages.
U.S. Appl. No. 16/108,522, "Non-Final Office Action", dated Sep. 9, 2020, 10 pages.
EP16738994.9, "Notice of Decision to Grant", dated Sep. 24, 2020, 2 pages.
U.S. Appl. No. 16/108,503, "Non-Final Office Action", dated Oct. 2, 2020, 61 pages.
Chinese Patent Application No. 2016800398919, "Office Action", dated Jun. 10, 2020, 20 pages.
U.S. Appl. No. 15/962,133, "Final Office Action", dated Jul. 7, 2020, 23 pages.

* cited by examiner

SELECTIVE CHARGING MATRIX FOR RECHARGEABLE BATTERIES

CROSS-REFERENCE TO RELATED APPLICATION

This application claims the benefit of U.S. Application Ser. No. 62/625,610, filed Feb. 2, 2018, the disclosure of which is hereby incorporated by reference in its entirety for all purposes.

TECHNICAL FIELD

The present technology relates to batteries and battery components. More specifically, the present technology relates to electrode configurations providing selective sensing and charging capabilities.

BACKGROUND

In battery-powered devices, battery cells characterized by large dimensions may be susceptible to charge uniformity issues that may be related to physical or operational irregularities across the cells. Improved designs are needed.

SUMMARY

The present technology relates to energy storage devices, including battery cells and batteries, which may include lithium-ion batteries having a variety of shapes including stacked cells, which may be or include bipolar batteries or stacked batteries, for example. These devices may include current collectors configured based on a z-directional transmission of current through the cell components, although current collectors configured based on an xy-directional transmission of current may also benefit from the present designs. The batteries and cells may include a host of features and material configurations as will be described throughout the disclosure.

Energy storage devices, battery cells, and batteries of the present technology may include a first current collector having an anode active material disposed along a first surface of the first current collector. The cells may include a plurality of first electrodes positioned along a second surface of the first current collector opposite the first surface of the first current collector. The plurality of first electrodes may be characterized by a first orientation. The cells may include a second current collector having a cathode active material disposed along a first surface of the second current collector. The cells may include a separator positioned between the anode active material and the cathode active material. The cells may also include a plurality of second electrodes positioned along a second surface of the second current collector opposite the first surface of the second current collector. The plurality of second electrodes may be characterized by a second orientation substantially orthogonal to the first orientation.

In some embodiments the plurality of first electrodes may include wires extending from a first edge of the first current collector to a second edge of the first current collector opposite the first edge of the first current collector. The wires may be distributed parallel to each other in the first orientation. The plurality of second electrodes may include wires extending from a first edge of the second current collector to a second edge of the second current collector opposite the first edge of the second current collector. The wires may be distributed parallel to each other in the second orientation, whereby the plurality of first electrodes and the plurality of second electrodes define a grid through the battery cell. A subset of the plurality of first electrodes may include at least partially arcuate lines extending from a first edge of the first current collector to a second edge of the first current collector opposite the first edge of the first current collector. The first current collector and the second current collector may each include a polymer current collector. An in-plane resistivity of the polymer current collectors may be greater than or about 0.005 ohm-meters across a lateral distance of the polymer current collectors.

The battery cell may also include electrical circuitry configured to selectively couple with one or more of the first electrodes and second electrodes. When the electrical circuitry electronically couples with a first electrode and a second electrode, the electrical circuitry may be configured to determine a voltage of the battery cell at a coordinate position defined through the battery cell between the first electrode and the second electrode. The electrical circuitry may be further configured to provide current along a first electrode and a second electrode to selectively charge a portion of the battery cell at a coordinate position defined through the battery cell between the first electrode and the second electrode. The electrical circuitry may be further configured to selectively engage multiple first electrodes and multiple second electrodes to distribute charge from a first coordinate position defined through the battery cell between a first electrode and a second electrode to a second coordinate position defined through the battery cell between an additional first electrode and an additional second electrode.

Some embodiments of the present technology may also encompass multi-cell batteries. The multi-cell batteries may include a first cell including a first current collector, a first anode, a first cathode, and a second current collector. The batteries may also include a second cell including a third current collector, a second anode, a second cathode, and a fourth current collector. The batteries may include a plurality of first electrodes positioned along an exterior surface of the first current collector. The plurality of first electrodes may include conductive wires positioned parallel to one another across the exterior surface of the first current collector in a first lateral direction. The batteries may also include a plurality of second electrodes positioned along an exterior surface of the third current collector and electrically coupled with the second current collector. The plurality of second electrodes may include conductive wires positioned parallel to one another across the exterior surface of the third current collector in a second lateral direction orthogonal to the first lateral direction. The first current collector and the third current collector may each include a polymer current collector containing an amount of a conductive material. The polymer current collectors may be characterized by a resistance greater than or about 0.001 ohm-meters.

The multi-cell battery may be characterized by length and width dimensions greater than 100 mm, and each first electrode may be spaced from a neighboring first electrode by at least about 5 mm. When one of the first electrodes and one of the second electrodes are coupled with circuitry, a voltage may be determined in a region about an axis through the first cell extending normal to the one of the first electrodes and the one of the second electrodes. Each electrode of the plurality of first electrodes and the plurality of second electrodes may individually be coupled with circuitry configured to provide an amount of current along any one electrode of the plurality of first electrodes and any one electrode of the plurality of second electrodes to selectively charge a region of the first cell about an axis through the first cell extending normal to the one electrode of the plurality of first electrodes and the one electrode of the plurality of second electrodes.

Some embodiments of the present technology may also encompass battery cells, which may include a first polymer current collector and an anode active material disposed along a first surface of the first polymer current collector. The battery cells may include a first plurality of conductive traces positioned along a length of the first polymer current collector from a first edge of the first polymer current collector to a second edge of the first polymer current collector. The first plurality of conductive traces may be disposed parallel to one another. The battery cells may also include a second polymer current collector and a cathode active material disposed along a first surface of the second polymer current collector. The battery cells may include a separator positioned between the anode active material and the cathode active material. The battery cells may also include a second plurality of conductive traces positioned along a width of the second polymer current collector from a third edge of the second polymer current collector to a fourth edge of the second polymer current collector. The second plurality of conductive traces may be disposed parallel to one another.

In some embodiments the first plurality of conductive traces and the second plurality of conductive traces may include one or more of copper, nickel, aluminum, silver, or carbon. Each conductive trace may be characterized by a thickness of less than or about 0.5 mm. The battery cells may also include control circuitry associated with each plurality of conductive traces and coupleable with each conductive trace individually. The control circuitry may be configured to measure an electrical potential on a conductive trace or deliver a current along a conductive trace.

Such technology may provide numerous benefits over conventional technology. For example, the present devices may provide regional charging capability within a cell structure, which may improve charge uniformity throughout the cell. Additionally, the designs may allow voltage sensing across multiple regions of the cells. These and other embodiments, along with many of their advantages and features, are described in more detail in conjunction with the below description and attached figures.

BRIEF DESCRIPTION OF THE DRAWINGS

A further understanding of the nature and advantages of the disclosed embodiments may be realized by reference to the remaining portions of the specification and the drawings.

Several of the figures are included as schematics. It is to be understood that the figures are for illustrative purposes, and are not to be considered of scale unless specifically stated to be of scale. Additionally, as schematics, the figures are provided to aid comprehension and may not include all aspects or information compared to realistic representations, and may include exaggerated material for illustrative purposes.

In the figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

As devices increase in size, or power requirements increase, batteries may be scaled to provide adequate power. Some form factors, such as in some stacked cell configurations, may be provided with relatively large lateral dimensions at reduced thickness. For example, a stack of cells may be characterized by several dozen centimeters in lateral dimensions, with a thickness of multiple cells being less than a centimeter. These designs may be advantageous for cells configured to transfer current in series along a z-direction through the cells, as opposed to along lateral dimensions of the current collectors to a collection of electrically coupled tabs, such as in many conventional designs. However, when battery cells are formed based on larger lateral dimensions, discrepancies within the cell may cause uniformity issues. For example, temperature difference across the cell may result in reduced capacity in some regions compared to others. This may result in non-uniform charging and discharging, which can cause cell performance issues over time in conventional technologies.

The present technology may overcome these issues by incorporating a matrix of electrodes on opposite surfaces of a battery cell, which may operate with or as the current collector. The matrix electrodes may produce a composite grid of electrodes along the battery cell that may be used in a number of ways. For example, the matrix electrodes may be engaged to selectively determine charge across regions of the cell, or selectively charge regions of the cell. Additionally, the matrix electrodes may be engaged to distribute charge from one region of a cell to another. Accordingly, cell charge may be maintained in a more uniform manner during operation of a battery including the cell.

Although the remaining portions of the description will routinely reference batteries with an alkaline electrolyte, it will be readily understood by the skilled artisan that the technology is not so limited. The present designs may be employed with any number of battery or energy storage devices, including other rechargeable and primary, or non-rechargeable, battery types, as well as electrochemical capacitors also known as supercapacitors or ultracapacitors.

Moreover, the present technology may be applicable to batteries and energy storage devices used in any number of technologies that may include, without limitation, phones and mobile devices, handheld electronic devices, laptops and other computers, appliances, heavy machinery, transportation equipment including automobiles, water-faring vessels, air travel equipment, and space travel equipment, as well as any other device that may use batteries or benefit from the discussed designs. Accordingly, the disclosure and claims are not to be considered limited to any particular example discussed, but can be utilized broadly with any number of devices that may exhibit some or all of the electrical or chemical characteristics of the discussed examples.

Figure 1:
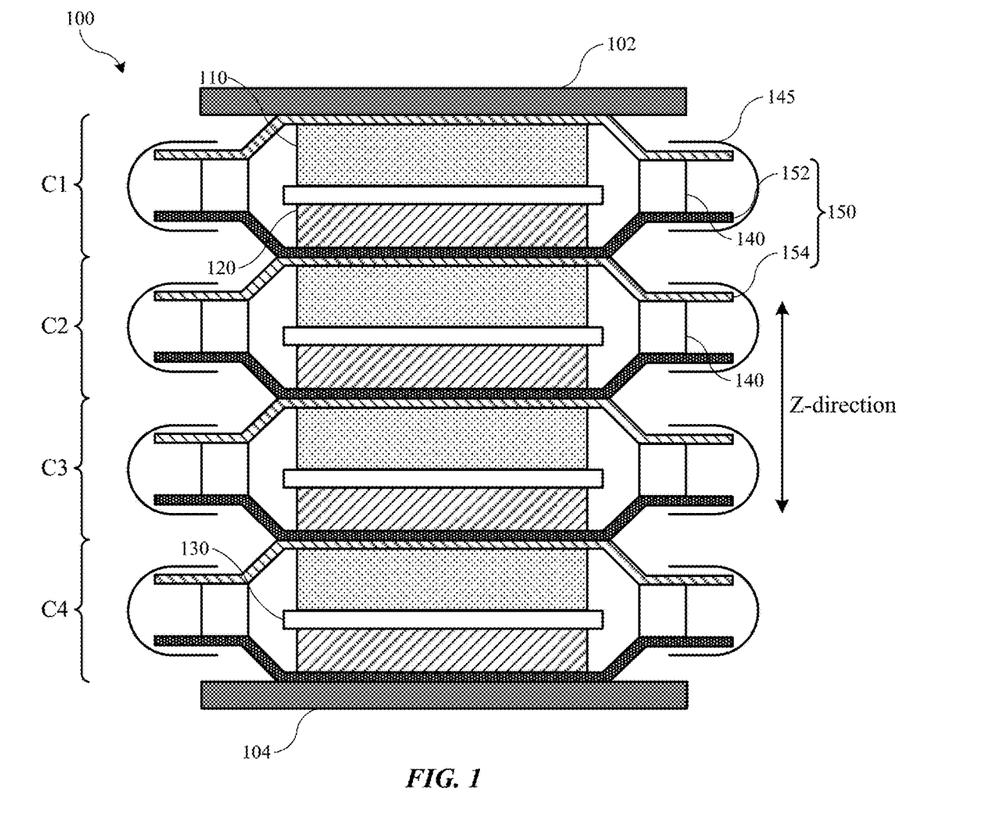
FIG. 1 shows a schematic cross-sectional view of an energy storage device according to some embodiments of the present technology.

FIG. 1 depicts a schematic cross-sectional view of an energy storage device according to embodiments of the present technology. The energy storage devices may include a single current collector or coupled current collectors. The energy storage devices may operate in a conventional manner with regard to electronic flow across or through material layers, such as providing electronic mobility across an xy-plane of the current collectors. Additionally, the described devices may operate by electronic flow through the structure in a z-direction through individual cells as opposed to via tabbed current collectors as described above for conventional batteries.

As illustrated, the stacked battery 100 may include a stack of electrochemical cells C1, C2, C3, and C4 between end plates 102 and 104. End plates 102 and 104 may be metal current collector plates, which can serve both electrical and mechanical functions. In some embodiments, end plates 102 and 104 can be support plates that form part of an external housing of the stacked battery. End plates 102 and 104 may also provide mechanical support within a housing of the stacked battery. Some or all of the support plates may be electrically conductive, and there may be a terminal within the support plate that is electrically connected to the end plate. In embodiments an additional plate similar to end plates 102 and 104 may be disposed within the stack of cells, such as between two cells. This configuration including an additional plate may provide structural rigidity, and the additional plate may also preform electronic functions similar to end plates 102, 104. End plates 102 and 104 may act as positive and negative terminals of the battery. The cells may pass current in the Z-direction through individual cells to the end plates, which may transfer current in any direction across the plate and from the battery. The end plates may be utilized to charge the stack of cells.

The stack of electrochemical cells may include any number of electrochemical cells depending on the selected voltage for the stacked battery 100, along with the individual voltage of each individual electrochemical cell. The cell stack may be arranged with as many or as few electrochemical cells in series as desired, as well as with intervening plates for support and current transfer. The cells C may be positioned adjacent, e.g. abutting, one another in some configurations. Each electrochemical cell C may include a cathode 110 and an anode 120, where the cathode 110 and anode 120 may be separated by separator 130 between the cathode and anode. Between the anode 120 of cell C1 and the cathode of adjacent cell C2 may be a stacked current collector 150. The stacked current collector 150 may form part of C1 and C2. On one side, stacked current collector 150 may be connected to the seal 140 of C1 and connected on an opposing side to the seal 140 of C2.

In some embodiments, as shown in FIG. 1, stacked current collector 150 may include a first current collector 152 and a second current collector 154. As shown in the figure, in some embodiments the first current collector 152 and second current collector 154 can be different materials, and each layer may be multiple materials. In some embodiments, the first current collector 152 may be or include a material selected based on the potential of the anode 120, such as copper or any other suitable metal, as well as a non-metal material including a polymer. The second current collector may be a material selected based on the potential of the cathode 110, such as aluminum or other suitable metals, and may also be a non-metal material including a polymer. In other words, the materials for the first and second current collectors can be selected based on the materials that are selected for the anode and cathode active materials, as well as materials that are stable at the operating potentials of the electrode materials.

The first and second current collectors can be made of any material known in the art. For example, copper, aluminum, or stainless steel may be used, as well as composite materials having metallic aspects, and non-metallic materials including polymers. For example, in some exemplary structures one or both current collectors are a polymer having conductive characteristics. In some embodiments the current collectors may be characterized by a less conductive material than the materials for the matrix electrodes to allow charging and sensing, and the current collector may be characterized by a higher impedance than metals such as aluminum or copper. In some instances the metals or non-metals used in the first and second current collector can be the same or different. The materials selected for the anode and cathode active materials can be any suitable battery materials. For example, the anode material can be silicon, graphite, carbon, a tin alloy, lithium metal, a lithium containing material, such as lithium titanium oxide (LTO), or other suitable materials that can form an anode in a battery cell. Additionally, for example, the cathode material can be a lithium-containing material. In some embodiments, the lithium-containing material can be a lithium metal oxide, such as lithium cobalt oxide, lithium manganese oxide, lithium nickel manganese cobalt oxide, lithium nickel cobalt aluminum oxide, or lithium titanate, while in other embodiments, the lithium-containing material can be a lithium iron phosphate, or other suitable materials that can form a cathode in a battery cell.

The first and second current collectors may have any suitable thickness, and may have a thickness that allows for a seal to be formed and provides suitable mechanical stability to prevent failure, such as breakage of the layers, during anticipated usage of the stacked battery. Additionally, the thickness of the current collectors can be sufficiently thin to allow for bending and flexing in the separation region to accommodate expansion anticipated during cycling of the stacked battery, including, for example, up to 10% expansion in the z-direction.

Figure 2:
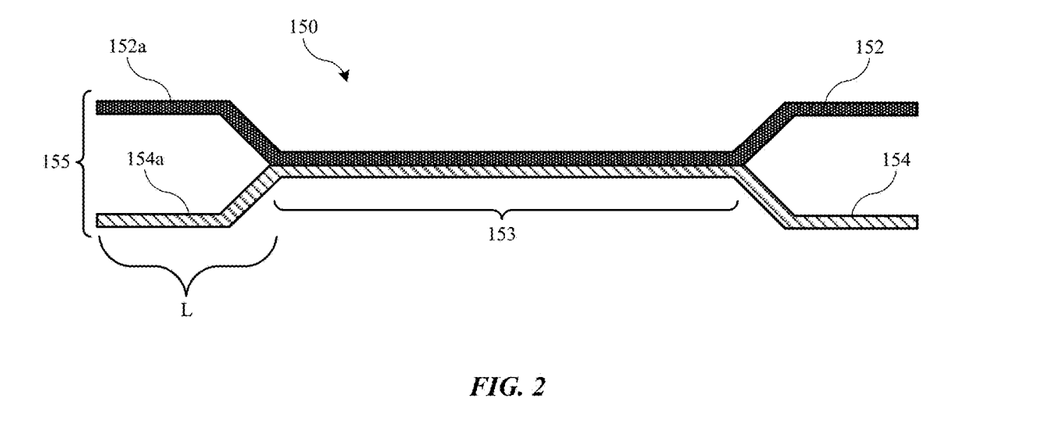
FIG. 2 shows a schematic cross-sectional view of a current collector according to some embodiments of the present technology.

Turning to FIG. 2, the stacked current collector 150 may have a connection region 153 where the first current collector 152 and second current collector 154 may be connected, and a gap region 155 at the peripheral ends of the collector 150. In the connection region 153, the first current collector and second current collector may be in direct contact or otherwise joined to be electrically-conductive. In some embodiments, the first current collector and second current collector may be directly connected, while in other embodiments the first current collector and second current collector may be indirectly connected via a conductive material. To form the connection region 153, the first current collector 152 and the second current collector 154 may be laminated together. Additionally, the connection region 153 may be created by welding the first current collector 152 and the second current collector 154 together, or by heat treating the current collectors to produce a bonded or connected structure. The connection region 153 may also be created by using an adhesive, which may be electrically conductive, between the first current collector 152 and the second current collector 154. In other embodiments, the connection region 153 may be created by the wetting that can occur between the materials of the first current collector 152 and the second current collector 154.

In the gap region 155, the peripheral ends of the first current collector 152 and the second current collector 154 may be spaced apart and moveable relative to each other. As such, there may be a separation distance between the first and second current collectors, which may increase as the electrochemical cell swells. In some embodiments, the spaced apart peripheral ends of the first current collector 152 and the second current collector 154 may be of a length that is sufficient to accommodate an anticipated expansion of the individual electrochemical cells of the stacked battery during cycling of the battery. The peripheral ends of the current collectors 152a and 154a may have a length L, as shown in FIG. 2, which may be long enough that up to or at least about 10% expansion in the z-direction can be accommodated.

As shown in FIG. 1, each cell C1, C2, C3, and C4, also includes a seal 140, which, with the current collector layers, may electrochemically isolate the electrochemical cells from each other. Thus, each cathode-anode pair may be electrochemically sealed and isolated from neighboring electrochemical cells. Because the current collectors 152 and 154 may be separated at the peripheral ends, separate seals 140 can be formed on opposing sides, such as a top and bottom, of the stacked current collector 150. The seals 140 may be the same or different materials, and each seal 140 may also be a laminate, composite, or coupling of two or more materials in embodiments.

The seal material may be able to bond with the first and second layers of the stacked current collector to prevent electrolyte leakage. The seal material may be a polymer, an epoxy, or other suitable electrically-insulating material that can bond with first and second current collectors to create a seal, which may be a hermetic seal. In some embodiments, the polymer may be polypropylene, polyethylene, polyethylene terephthalate, polytrimethylene terephthalate, polyimide, or any other suitable polymer that may bond with the first and second current collectors of the stacked current collector to form a hermetic seal and may also provide resistance to moisture ingress. The electrolyte may be a solid, a gel, or a liquid in embodiments. The seal may electrochemically isolate each electrochemical cell by hermetically sealing the cell, thereby preventing ions in the electrolyte from escaping to a neighboring electrochemical cell. The seal material may be any material providing adequate bonding with the metal layers such that the seal may be maintained through a predetermined period of time or battery usage.

The separator may be wetted with the electrolyte, such as a fluid electrolyte or gel electrolyte, to incorporate the electrolyte into the stacked battery. Alternatively, a gel electrolyte may coat the separator. In still further alternatives, a gel electrolyte may coat the first current collector and/or second current collector before combination. Additionally, the electrolyte may be blended with particles of electrode active material. In various embodiments, incorporating the electrolyte into the components of the stacked battery may reduce gassing in the stacked battery. In variations that include a flexible seal, the stacked battery may accommodate gas resulting from degassing.

The individual electrochemical cells may be formed in any suitable manner. In some embodiments, the cathode 110, the anode 120, and the separator 130 may be preassembled. A first current collector 152 may then be connected to the anode while a second current collector 154 may be connected to the cathode to create a cell. The seal material may be disposed between the first current collector 152 and the second current collector 154 to form seals 140. Finally, the peripheral ends of the sealed electrochemical cell may be further taped to frame the cell. Tapes 145, as well as other coatings, sealing, or material layers, may be disposed around the outer perimeter of the metal layers and seals. The tape 145 may be substituted with ceramic or polymeric materials. Tape 145 may be included for various reasons including to prevent shorting to adjacent layers or to surrounding conductive surfaces within the device, to provide improved electrochemical or chemical stability, and to provide mechanical strength.

FIGS. 1 and 2 illustrate an exemplary stacked battery design according to some embodiments of the present technology. Additional configurations other than illustrated, or as variations on the designs, are also encompassed by the present technology. For example, certain embodiments may not include an additional seal material, and first current collector 152 and second current collector 154 may be directly coupled or bonded together, as will be discussed below. Additionally, the current collectors may include designs including combinations of polymer material and conductive materials, such as within a matrix.

An exemplary matrix for a current collector may include a polymer disposed as the matrix material or as part of the matrix material. The matrix may provide an insulative design that limits or reduces xy-directional conductivity. The polymer matrix may be developed with a conductive material to produce a current collector having particular electrochemical or composite properties, such as electrical conductivity in the z-direction or through the cell. For example, conductive particulate material may be incorporated within the matrix either homogenously, or in any number of organized ways. The conductive material may include any of the conductive materials previously identified. In embodiments, the conductive material may include one or more of silver, aluminum, copper, stainless steel, and a carbon-containing material. In this way, the current collector may have a tuned resistivity to provide directional control for electrical conductivity. For example, the produced current collector may be configured to provide an in-plane resistivity across a length in the xy-plane, as well as a through-plane resistivity in the z-direction, which is greater than or about $1 \times 10^{-4}$ ohm-m in embodiments. Additionally, exemplary current collectors may have an in-plane and through-plane resistivity of between about $1 \times 10^{-3}$ ohm-m and about 1,000 ohm-m. In other embodiments, more conventional electrical distribution may be employed, where current is transferred along conductive current collectors into and out of the cell. In some embodiments, similar polymer current collectors may be utilized for both the anode and cathode current collectors.

By utilizing current collectors designed to facilitate through-plane current flow while reducing in-plane current flow, the distance of electronic travel to series connected cells may be several orders of magnitude less than designs that direct electronic flow from individual cells across current collectors to exterior tabs. Accordingly, for some stacked cell designs, maintaining certain thresholds of conductivity in the current collectors to limit the effect on capacity and operation may no longer be an issue. As the distance of electronic travel from each cell decreases, the resistivity associated with electronic travel decreases as well. However, because of the reduced conductivity within and through the cell structures, the present technology may provide additional components to address charge imbalance within a cell.

Figure 3:
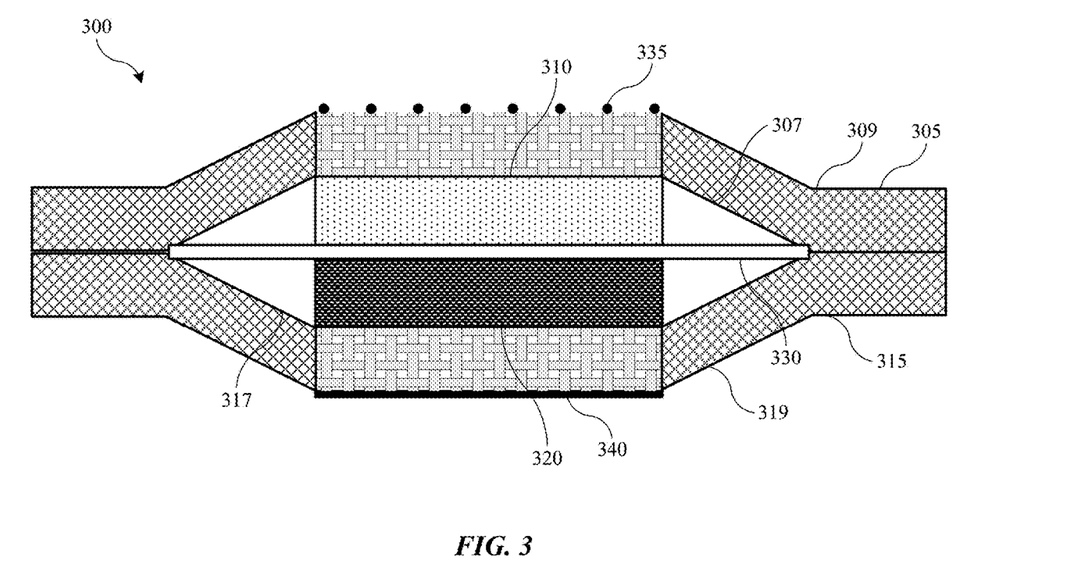
FIG. 3 shows a schematic cross-sectional view of a battery cell according to some embodiments of the present technology.

FIG. 3 illustrates a schematic cross-sectional view of a battery cell 300 according to some embodiments of the present technology. Battery cell 300 may be a cell included in energy storage device 100 described previously, and may include any of the components or characteristics discussed above with regard to that cell. For example, battery cell 300 may include a first current collector 305. An anode active material 310 may be disposed along a first surface 307 of the first current collector 305. Battery cell 300 may also include a second current collector 315. A cathode active material 320 may be disposed along a first surface 317 of the second current collector 315. A separator 330 may be positioned between the anode active material and the cathode active material.

First current collector 305 and second current collector 315 may be any materials previously described, including metal materials, polymer materials, or combinations of the two. In some embodiments, either or both of first current collector 305 and second current collector 310 may be a polymer current collector incorporating an amount of conductive material to produce a conductivity as explained above. The current collectors may have an in-plane resistivity across a length in the xy-plane that is greater than or about $1\times10^{-8}$ ohm-m in embodiments. However, based on the cell configuration, the current collectors may have an in-plane resistivity across the current collector of greater than or about $1\times10^{-7}$ ohm-m, greater than or about $1\times10^{-6}$ ohm-m, greater than or about $1\times10^{-5}$ ohm-m, greater than or about $1\times10^{-4}$ ohm-m, greater than or about 0.005 ohm-m, greater than or about 0.01 ohm-m, greater than or about 0.05 ohm-m, greater than or about 0.1 ohm-m, greater than or about 0.5 ohm-m, greater than or about 1 ohm-m, greater than or about 10 ohm-m, greater than or about 100 ohm-m, greater than or about 1,000 ohm-m, greater than or about 10,000 ohm-m, or more in embodiments. Additionally, either or both of the current collectors may have an in-plane resistivity of between about $1\times10^{-5}$ ohm-m and about 1,000 ohm-m. The current collectors may also have an in-plane resistivity between about 0.005 ohm-m and about 1 ohm-m, or between about 0.05 ohm-m and about 1 ohm-m. The through-plane resistivity may be within any of the noted ranges, and may be greater than, less than, or similar to the in-plane resistivity. Any combination of resistivity in-plane and through-plane may be produced by adjusting an amount of conductive material distributed within the polymer current collectors, as well as with the pattern of distribution.

Conductive material may be placed throughout the polymer current collectors, although in some embodiments the conductive material may be maintained within a central region of the current collector corresponding to an active region on which the electrode active material is disposed. Accordingly, an exterior region about the current collector may be maintained free of any conductive additive. In these embodiments, an additional seal material may or may not be included as previously discussed. As illustrated, first current collector 305 and second current collector 315 may be laminated together about an edge region. Separator 330 may or may not be fully or partially included in the lamination to maintain an electrical separation between the anode active material and the cathode active material.

Battery cell 300 may include matrix electrodes as previously noted, which may include a plurality of first electrodes 335 positioned along a second surface 309 of the first current collector 305, which may be opposite the first surface 307 on which the anode active material is disposed. First electrodes 335 may be incorporated across the entire second surface 309 in some embodiments, or may be included within the active region of the current collector. First electrodes 335 may all extend similarly across the second surface, and may be characterized by a first orientation across the battery cell 300. A plurality of second electrodes 340 may also be included with battery cell 300, and may be positioned along a second surface 319 of the second current collector 315, which may be opposite the first surface 317 on which the cathode active material is disposed. The second electrodes 340 may also be incorporated across the entire second surface 319, or may extend within the active region of the current collector. Second electrodes 340 may all extend similarly across the second surface, and may be characterized by a second orientation across the battery cell 300. In some embodiments, the second orientation may be substantially or essentially orthogonal to the first orientation.

In some embodiments the conductive first and second electrodes may be incorporated within the polymer current collectors, when used, to limit an amount of height added between battery cells incorporated within a stack. Additionally, the first and second electrodes may be compressed between current collectors of two adjacent battery cells of a stack. Because embodiments of the present technology may distribute current in a z-direction through a stack of cells, a substantial contact between current collectors of adjacent cells may be maintained across or about the first electrodes and second electrodes.

First electrodes 335 and second electrodes 340 may be or include a number of materials disposed along the current collectors, and may be the same or different materials in embodiments. Because the electrodes may not contact electrolyte when disposed on external surfaces of the cells, there may be no concern for stability at either electrode potential. For example, either or both of first electrodes 335 and second electrodes 340 may be or include one or more of copper, nickel, aluminum, silver, a carbon material, or some combination. For example, the electrodes may be an alloy of copper and nickel, or any of the materials individually, as well as any other conductive material that may operate as will be described further below.

First electrodes 335 and second electrodes 340 may be characterized by a relatively limited size regardless of the lateral dimensions of the battery cell. For example, first electrodes 335 and second electrodes 340 may be similar to conductive traces, such as used in circuitry, and may be formed along the current collectors in a variety of ways including physical placement, chemical vapor deposition, ink printing, or other methods that may allow consistent deposition or formation of electrode material that may be less than or about 0.5 mm in diameter and/or thickness regardless of shape. In some embodiments, the electrodes may each be less than or about 0.3 mm, less than or about 0.2 mm, less than or about 0.1 mm, less than or about 80 μm, less than or about 60 μm, less than or about 40 μm, less than or about 20 μm, less than or about 10 μm, or less. The first electrodes and second electrodes may each be wires or traces extending fully across an active region of the battery cell, and may be maintained offset from one another to produce nodes or coordinate locations across the battery cell as will be discussed below. Although in embodiments the first electrodes and second electrodes may be oriented orthogonally to one another, the first electrode and second electrode groups may be offset from one another to any extent from about one degree to about one-hundred-seventy-nine degrees.

Figure 4:
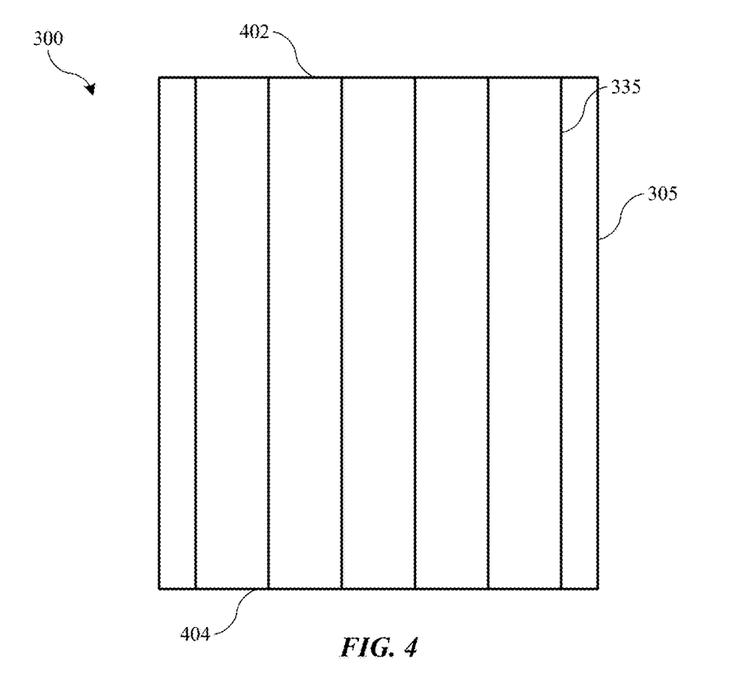
FIG. 4 shows a schematic top plan view of a portion of a battery cell according to some embodiments of the present technology.

FIG. 4 shows a schematic top plan view of a portion of battery cell 300 according to some embodiments of the present technology, and may illustrate a view of the first electrodes 335. FIG. 4 may illustrate an active portion of first current collector 305, such as along a portion associated with the active material. As shown, the first electrodes 335 may be a set of wires extending from a first edge 402 of the first current collector to a second edge 404 of the first current collector opposite the first edge 402. The first electrodes 335 may be positioned substantially parallel to one another in the orientation illustrated.

Figure 5:
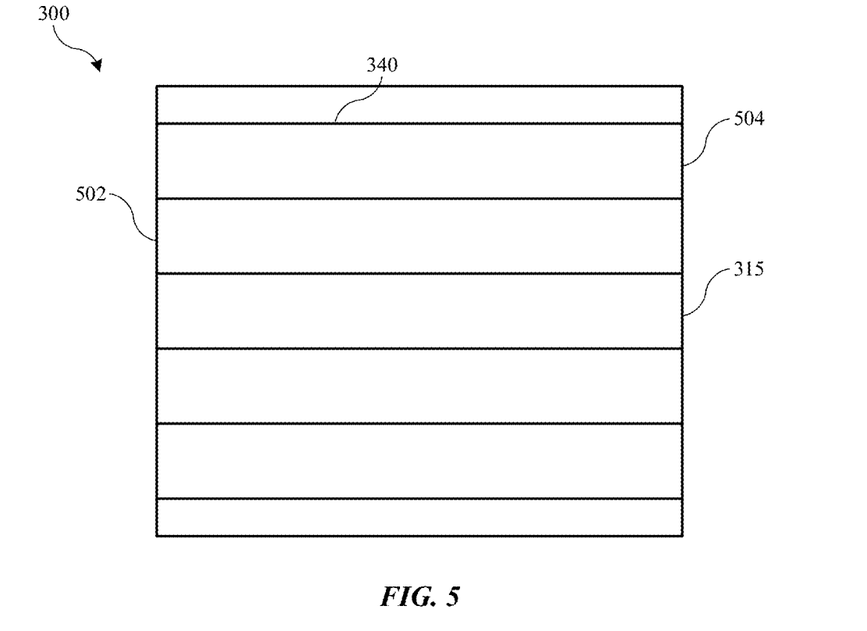
FIG. 5 shows a schematic bottom plan view of a portion of a battery cell according to some embodiments of the present technology.

FIG. 5 shows a schematic bottom plan view of a portion of battery cell 300 according to some embodiments of the present technology, and may illustrate a view of the second electrodes 340. FIG. 5 may illustrate an active portion of the second current collector 315, such as along a portion associated with the active material on the opposite surface of the second current collector 315. As shown, the second electrodes 340 may also be a set of wires extending from a first edge 502 of the second current collector to a second edge 504 of the second current collector opposite the first edge 502. The second electrodes 340 may be positioned substantially parallel to one another in the orientation illustrated, which may be an orientation rotated from the orientation of the first electrodes 335. As noted above, the second electrodes are illustrated in an orientation substantially orthogonal to the first electrodes of FIG. 4, although any other orientation offset from the first electrodes may also apply in embodiments.

In both FIG. 4 and FIG. 5 the electrodes may be positioned parallel to one another and spaced evenly across the surface of the current collector. The electrodes also may be substantially parallel to one another but may be characterized by different spacing from one electrode to the next. The spacing between electrodes may be anywhere from a millimeter or less to a centimeter or more in embodiments depending on the size of the battery cell and the number of regions determined for the battery cell. For example, inter-electrode spacing may be at least about 2 mm, and may be at least about 4 mm, at least about 6 mm, at least about 8 mm, at least about 10 mm, at least about 12 mm, at least about 14 mm, at least about 16 mm, at least about 18 mm, at least about 20 mm, or more. The spacing may also be less than or about 5 cm, less than or about 4 cm, less than or about 3 cm, or less. The spacing of the first electrodes 335 and the second electrodes 340 may be the same or different in embodiments. It is to be understood that any spacing or orientation may also be encompassed that produces a grid or coordinate set across the battery cell. Depending on the size of the battery cell and the number and spacing of electrodes, the grid may include at least about 4 nodes along an interior portion of the battery cell. In some embodiments the grid may include at least about 10 nodes, and may include at least about 50 nodes, at least about 100 nodes, at least about 500 nodes, at least about 1,000 nodes, at least about 2,000 nodes, at least about 5,000 nodes, at least about 10,000 nodes, or more, as well as less than or between any of the stated numbers.

Figure 6:
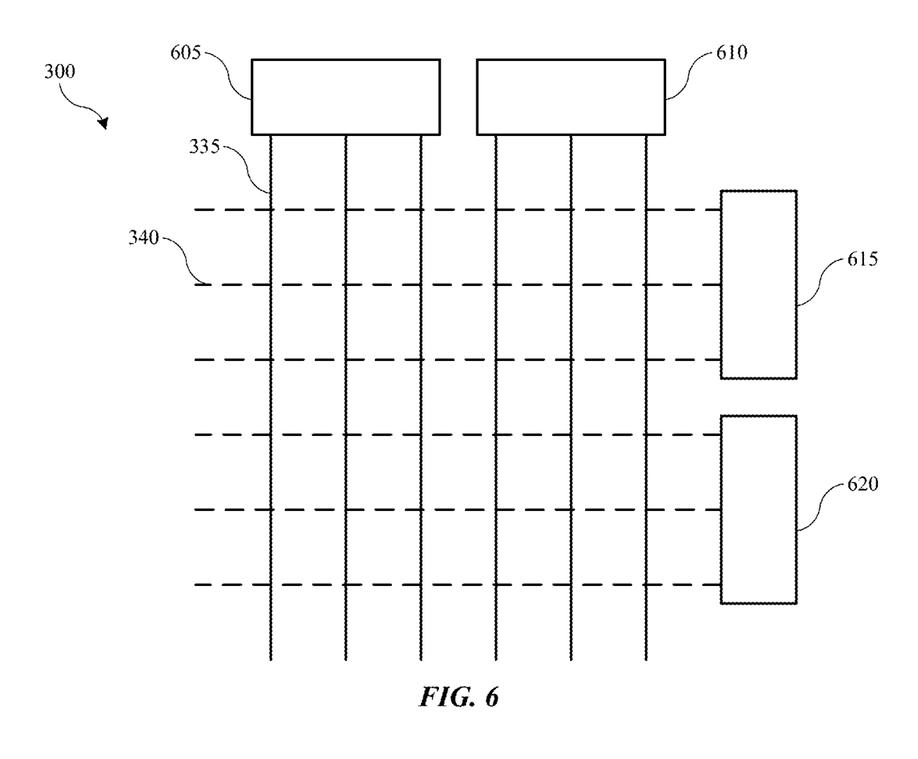
FIG. 6 shows a schematic overlay of electrodes on a battery cell according to some embodiments of the present technology.

Turning to FIG. 6 is shown a schematic overlay of electrodes on battery cell 300 according to some embodiments of the present technology. FIG. 6 illustrates a view of the battery cell 300 from a top view, with the internal cell components removed for ease of explanation. First electrodes 335 are illustrated in a first lateral direction, and second electrodes 340, shown in hidden view through the battery cell, are illustrated in a second lateral direction orthogonal to the first electrodes. As illustrated through the cell, the electrodes are disposed on or in contact with opposite external surfaces of the battery cell, and the electrodes in the plurality of first electrodes 335 may not contact any of the electrodes in the plurality of second electrodes 340. However, the distribution of electrodes may effectively produce a spatial grid of regions of the battery cell.

Battery cells, batteries, or battery systems according to some embodiments of the present technology may also include an amount of electrical circuitry coupled with the first electrodes 335 and second electrodes 340 to provide functionality discussed below. A number of connections may be made at distal regions of the electrodes, which may provide electrical contacts for control circuitry. Each electrode of the plurality of electrodes may be individually connected in embodiments, and may be coupled in a variety of ways. For example, a transistor system may be provided and coupled with each electrode of the first electrodes and the second electrodes. Additionally, an analog or digital circuit, such as a multiplexer, may be coupled with sets of electrodes. For example, a first multiplexer 605 and a second multiplexer 610 may be connected with the first electrodes 335, and a third multiplexer 615 and a fourth multiplexer 620 may be connected with the second electrodes 340. Any number of multiplexers may be incorporated depending on the number of electrodes included with the battery cell and the number of inputs/outputs of the selected multiplexer. The multiplexers may feed information to a control circuit, or may deliver current to electrodes of a battery cell. In embodiments the multiplexers may be configured to select one or more electrodes at any time, and the control circuitry may be configured to receive or deliver a single or multiple signals from or to each multiplexer at any time. It is to be understood that although multiplexers 605-620 are illustrated as directly connected at the edge regions of the overlay, the connections may be extended further from the cells, such as utilizing additional trace materials, to allow clearance to be maintained in a cell stack.

Figure 7:
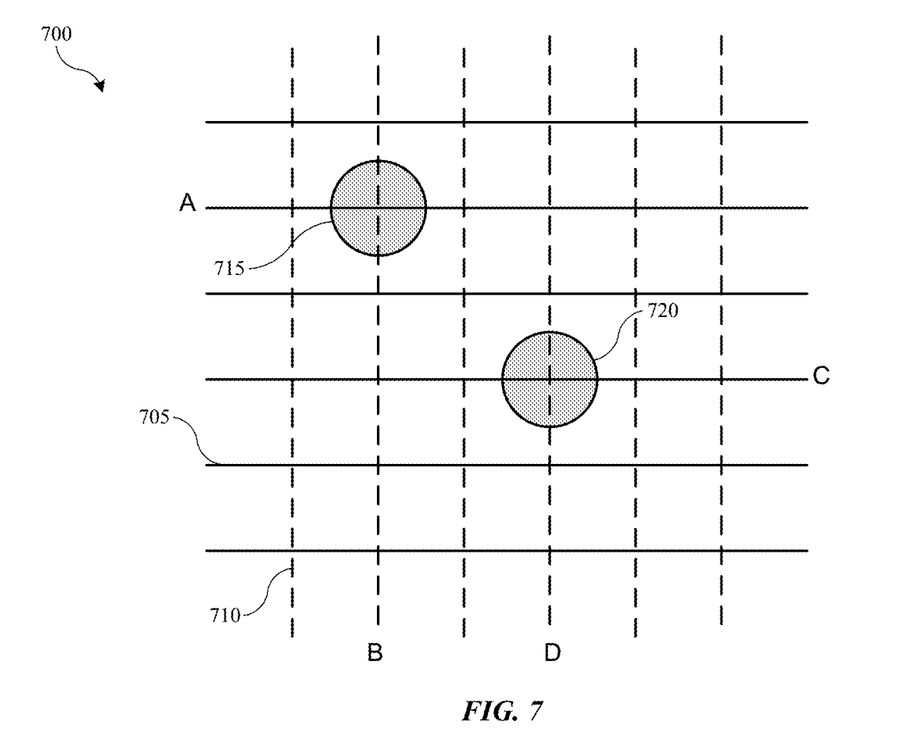
FIG. 7 shows a schematic overlay of electrodes on a battery cell according to some embodiments of the present technology.

In embodiments the electrodes and control circuitry may be configured to perform operations providing selective reading, charging, or distribution within regions of the battery cell. Additionally, methods of operating battery cells including first electrodes and second electrodes may be performed by the present technology. FIG. 7 shows a schematic overlay of electrodes as may be incorporated with an active region of a battery cell 700 according to some embodiments of the present technology. Aspects of battery cell 700 may include any of the components or structures previously described, although not specifically illustrated for ease of explanation. As previously discussed, the electrodes may be positioned on two opposing external sides of a battery cell that may be characterized by length and width dimensions greater than a thickness, which be an order of magnitude smaller, or any of the dimensions previously described. First electrodes 705 may be any of the electrodes or traces previously described, and may be positioned over or within a first surface of a battery cell, such as overlying a first current collector. Second electrodes 710, shown in hidden view through an exemplary cell, may be positioned over or within a second surface of the battery cell, which may be opposite the first, such as overlying the second current collector. The battery cell contained between the sets of electrodes may be any of the cells previously described, and may be a battery cell configured to provide current in a z-direction through the cell from the current collectors. As illustrated, and in some embodiments, none of the electrodes directly contact any other electrodes either within the set of electrodes or between sets of electrodes.

First electrodes 705 and second electrodes 710 may be coupled with circuitry as previously described in order to perform a number of functions related to sensing or cell balancing, for example. Because each electrode trace of the sets of electrodes extends fully across the surface of the current collector, or at least partially extends over the active region, each electrode trace may cross an electrode from the opposite set of electrodes at a coordinate position through the battery. For example, the battery cell may be considered as a number of parallel stacked xy planes, with a first plane along a first exterior surface on which the first electrodes 705 reside, and a final plane along a second exterior surface opposite the first exterior surface, and on which the second electrodes 710 reside. An axis may be extended normal to the set of planes through an electrode of the first electrodes 705 and an electrode of the second electrodes 710, which produces a common xy coordinate of the battery cell through each plane in the z-direction. Accordingly, each pair of electrodes, being one electrode from the first electrodes 705 and one electrode from the second electrodes 710, may define an xy position of spatial intersection at each $z_1$ through $z_n$ axial positions through the N planes of the battery cell. Although the electrodes of the first electrodes 705 may not contact the electrodes of the second electrodes 710 at any position, each electrode pair may commonly extend through an xy coordinate defined by a z-axis through the battery cell, which may be understood to be an intersection spatially, electrically, or otherwise as a coordinate position or node as discussed elsewhere.

For example, referring to FIG. 7, a coordinate position may be defined as the location where electrode A of the first electrodes 705 and electrode B of the second electrodes 710 intersect. As noted the two electrodes do not physically contact as they may be positioned on opposing external surfaces of the battery cell 700, or incorporated within the two current collectors on opposite sides of the battery cell 700. Regardless, each of electrodes A and B may pass through an xy-coordinate position AB of battery cell 700 that may be defined through the battery cell between the first electrode and the second electrode, and may be identified by region 715.

As previously noted, charge within battery cell 700 may not be consistent at all locations at all times. For example, due to mechanical process tolerances, a thickness of the anode or cathode active materials may not be perfectly consistent across the battery cell. Additionally, during operation, due to the lateral size of cells in some embodiments, a temperature gradient may develop across the cell, or hot spots may develop. Due to these or other issues, such as electrolyte imbalances or other inconsistencies, the charge within different regions of the cell may not be uniform. When the cell is initially charged, such as with plates 102, 104 discussed previously, the cell may or may not fully charge to a pre-determined voltage at all specific positions, and charge may dissipate at different rates in different locations throughout the cell. Conventional techniques, such as with metal current collectors including a tab region, may simply be capable of determining an overall potential of the entire anode or cathode, and not a potential at any particular location within the anode or cathode. However, by utilizing the first electrodes and second electrodes of the present technology, improved sensing may be performed, that advantageously may allow selective charging as well.

For example, utilizing circuitry, such as previously described, a battery management system may be configured to electrically couple or connect with electrode A of the first set of electrodes and also with electrode B of the second set of electrodes. When this coupling is performed, a potential difference may be determined at location AB, which may be used to determine a voltage at the location AB within the cell. This may correspond to a local charge determined at spatial location 715. Although the current collectors may be characterized by a relatively low conductivity, such as when a polymer current collector as previously described is used for each current collector, an amount of lateral conductivity still exists, which may essentially roughen the potential reading performed. However, this may be accounted by the battery management system based on predetermined testing of the current collectors to allow an estimation or determination to be performed to more accurately identify the local voltage at the tested position. If the circuitry maintains the connection with electrode B, but switches the connection from electrode A to electrode B, the system may then determine the local voltage at position CB on the battery. Accordingly, by selectively engaging each pair of electrodes across the battery cell, voltage may be tested at every coordinate position through the cell providing a relative map or grid of voltage or charge distribution through the cell. Based on an addressing scheme, the entire matrix of coordinate positions may be effectively tested in microseconds, milliseconds, or less than one second or a few seconds, even with tens, hundreds, or thousands of nodes or coordinate positions across a battery cell. This may allow diagnostic identification of battery health, which may incorporate information from additional sources, such as thermocouples positioned throughout the cell.

After the identification of charge disparities or voltage differences has been performed, the electrodes may also be used to selectively charge positions about the battery cell. For example, an exemplary cell may be characterized by a full charge voltage of 5 V. It is to be understood that this is only an example for illustration, and the cell may be formed to provide a full charge voltage at any other voltage as well. Once the cell or stack of cells has been charged, such as with charging plates charging every cell in the stack, a sensing operation using the first electrodes and second electrodes may be performed across each cell. In one example, the sensing operation may identify that location AB did not fully charge to 5 V, and may have charged only to 4.8 V, for example. In this scenario, an additional operation may be performed via the first electrodes 705 and the second electrodes 710. For example, a current may be distributed along electrode A and electrode B, which will allow charging at location AB, defined between the first electrode A and second electrode B through the cell at position 715, to raise the voltage from 4.8 V up to 5 V. The charging operation may be performed in any number of ways similar to standard charging. In one example, the amount of current provided for selective charging may be between about 0.1 C and about 10 C, between about 0.5 C and about 8 C, between about 1 C and about 5 C, or between any other charging rates.

The charging rate may be based on the charge of the entire battery, or in some embodiments on the area defined by the distribution of nodes or coordinate positions across the cell. Accordingly, the amount of current provided may be 5 C of the local area AB, which may be the target region of the charging. Thus, for one non-limiting example, a battery cell characterized as a 100 Ah cell may have ten first electrodes and ten second electrodes, providing one hundred nodes or coordinate positions. Charging a particular position may then provide 1 A if charging at 1 C, and may provide 5 A if charging at 5 C, for example. Based on the size of the battery cell, the current rating, the desired charge rate, and the number of nodes produced by the exterior electrodes, the current provided for selective charging may be less than 5 A in embodiments, and may be less than or about 1 A, less than or about 700 mA, less than or about 500 mA, less than or about 200 mA, less than or about 100 mA, less than or about 50 mA, less than or about 20 mA, less than or about 10 mA, less than or about 5 mA, less than or about 3 mA, or less.

In some embodiments, multiple areas of the cell may be charged simultaneously. For example, sensing operations may identify that both region 715 and region 720 may not have fully charged. The electronic circuitry may provide current along traces A, B, C, and D to selectively charge region AB and region CD up to full voltage. This charging may be performed without concern for overcharging locations CB or AD in some embodiments. For example, in a standard charging operation, locations CB and AD may have fully charged to 5 V, utilizing the previously noted non-limiting example. However, region AB and CD may have both charged to some voltage less than 5 V. When current is delivered over the electrode traces, the current may be delivered at 5 V as well, or at whatever voltage to which the cell may be charged. In this way, fully charged regions will not include a potential difference to drive current through the cell. Accordingly, regions CB and AD may be maintained at 5 V, while current may be delivered to the other locations to fully charge regions AB and CD to 5 V simultaneously. Any number of locations may be charged sequentially or simultaneously in some embodiments depending on the amount of current being provided, and the desired speed of charging.

In another situation the circuitry may be used to distribute current from one location to another, which may be performed at any time during operation or discharge of the cell. For example, during a sensing operation, the control system may identify that region AB may have been depleted to 75% of full charge, for example, while region CD may have been depleted to 60% of full charge. The circuitry may connect each of electrodes A, B, C, and D to effectively engage nodes AB and CD simultaneously. The difference in depletion may drive current from location AB to location CD along the electrodes. In this way, circuitry associated with the battery cell may engage multiple first electrodes and multiple second electrodes to distribute charge from any first coordinate position between a first electrode and a second electrode to any second coordinate position defined through the cell by also engaging an additional first electrode and an additional second electrode.

The first electrodes and second electrodes may also be engaged individually to selectively heat regions of the cell. For example, providing an amount of current along an electrode may heat that trace, and may allow selective heating in regions of the battery cell. Accordingly, the present technology may be used for any number of useful operations of cell diagnostics, charging, and charge distribution. These operations may also be performed in additional ways by modifying the distribution of electrodes across the cell.

Figure 8:
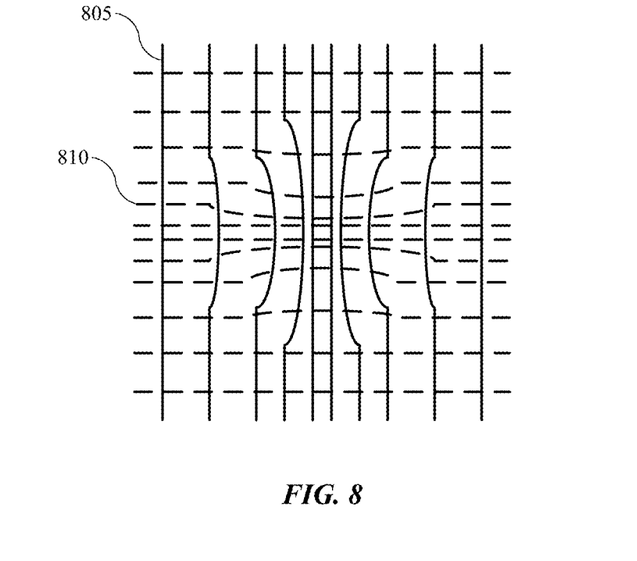
FIG. 8 shows a schematic overlay of electrodes on a battery cell according to some embodiments of the present technology.

FIG. 8 shows another schematic overlay of electrodes on a battery cell according to some embodiments of the present technology, and may be used with any of the battery cell configurations previously described. FIG. 8 illustrates first electrodes 805, which may be positioned along a first current collector of an exemplary battery cell, and second electrodes 810, which may be positioned along a second current collector of an exemplary battery cell, and are shown in hidden view as through an exemplary cell. As illustrated, a subset of the electrodes are characterized by at least a partially arcuate line extending from a first edge of the associated current collector to a second edge of the current collector opposite the first. The electrodes may include an arcuate section as illustrated, or may contain an overall curved configuration. FIG. 8 is intended to illustrate a single option for including non-parallel electrodes, and it is to be understood that any number of other non-parallel configurations can be provided and are similarly encompassed by the present technology.

In some embodiments, certain areas of the cell may be characterized by depletion faster than others, such as in known warmer zones of the cell, which may occur nearer to a center of the battery cell than at edge regions. Accordingly, the first electrodes and second electrodes may be characterized by different offsets and electrode spacing to provide additional sensing capabilities and current delivery in particular zones. However, spacing may be maintained beyond a threshold separation allowing differentiable measurements. For example, electrodes spaced closely together may provide similar readings as neighbor electrodes, and thus in some embodiments the electrodes within a set of electrodes may be characterized by a minimum cell spacing of at least about 0.5 mm, at least or about 1 mm, at least or about 5 mm, at least or about 10 mm, or more up to any of the previously noted electrode spacing.

Because the electrodes may be characterized by higher conductivity than the current collectors, maintaining a minimum spacing may also facilitate maintaining a substantially low in-plane conductivity as previously described. Additionally, the thickness of the electrodes may be maintained to enable a fusing function during fault conditions. For example, in fault situations a local temperature within the battery may rise sharply, which may lead to cell failure. Because of the conductivity of the conductive traces, they may facilitate distribution of fault current laterally from the cell. However, in some embodiments the traces or electrodes may be sized to fuse under fault conditions, which may interrupt electrical flow laterally along the traces, which may limit transmission to other cells or areas of a battery stack.

The electrode grids of the present technology may also be incorporated in manufacturing operations to provide additional testing for battery cells. For example, a testing apparatus may be formed according to designs of the present technology having two sets of electrodes that may be closed over a cell or set of battery cells being tested to perform any of the sensing or distribution operations discussed above. The electrodes may have any of the configurations discussed previously, and may be connected to control circuitry of the testing apparatus. Additionally, further failure testing may be performed providing improved results over conventional technology. For example, many batteries processed for quality assurance undergo a hipot, or high potential, test in which a high voltage is delivered to the device to determine weak points in insulation that may lead to breakdown, such as a weak area of a separator, for example. By utilizing grids according to embodiments of the present technology, such a hipot test may be performed that identifies whether a number of such failures occur or a pattern of faults, which may provide insight towards manufacturing defects that may not be discovered in more traditional testing. Accordingly, the present technology may not be limited to incorporation in battery cells alone, but may be utilized in testing and trouble-shooting devices as well.

Figure 9:
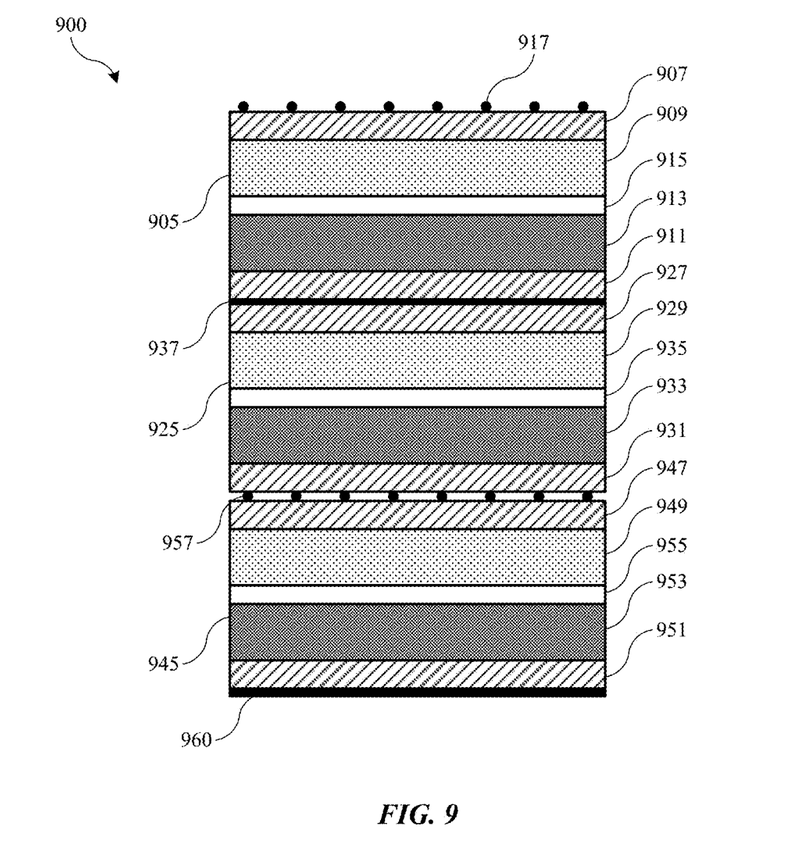
FIG. 9 shows a partial schematic multi-cell battery according to some embodiments of the present technology.

Turning to FIG. 9 is shown a partial schematic multi-cell battery 900 according to some embodiments of the present technology. FIG. 9 illustrates three battery cells incorporated in the battery, although it is to be understood that any number of cells may be included as previously discussed. As illustrated, battery 900 may include a first battery cell 905, a second battery cell 925, and a third battery cell 945. Each battery cell may be characterized by any of the structures or configurations discussed above, and FIG. 9 may be limited to illustrate an active region through the battery for the purpose of explanation. It is to be understood that battery 900 may be characterized by any of the lateral dimensions or characteristics previously described. First battery cell 905 may include a first current collector 907, a first anode active material 909, a second current collector 911, a first cathode active material 913, and a separator 915. Second battery cell 925 may include a third current collector 927, a second anode active material 929, a fourth current collector 931, a second cathode active material 933, and a separator 935. Third battery cell 945 may include a fifth current collector 947, a third anode active material 949, a sixth current collector 951, a third cathode active material 953, and a separator 955. The components may be any of the materials discussed above, and in embodiments some or all of the current collectors are polymer current collectors, which may have any of the previously described characteristics.

Battery 900 may also have sets of electrodes incorporated between cells similar to the electrodes described above. Battery 900 may include a first plurality of electrodes 917 positioned along an exterior of the first current collector 907. The electrodes may be oriented along a first lateral direction across the current collector. Battery 900 may include a second plurality of electrodes 937 positioned along an exterior of the third current collector 927, and which may be electrically coupled with the second current collector 911. The electrodes may be oriented along a second lateral direction across the current collector that may be orthogonal to the first lateral direction. Battery 900 may include a third plurality of electrodes 957 positioned along an exterior of the fifth current collector 947, and which may be electrically coupled with the fourth current collector 931. The electrodes may be oriented along a first lateral direction across the current collector similar to the first plurality of electrodes 917. Battery 900 may also include a fourth plurality of electrodes 960 electrically coupled with the sixth current collector 951, and which may be oriented along the second lateral direction similar to the second plurality of electrodes 937. Although not illustrated, electrical circuitry as previously described may be coupled with each of the electrodes to perform sensing and charging operations discussed above. It is to be understood that although a gap is illustrated between the current collectors of adjacent cells where the electrodes are positioned, this is merely for illustration, and the cells may be completely flush with adjacent cells about the individual electrode traces. In embodiments where the electrodes are incorporated within the current collectors, the entire exterior surface of an electrode may be coupled with an adjacent electrode.

The electrodes may be in any of the distributions previously described, and in some embodiments may be parallel to one another within a set of electrodes. As noted above, in some embodiments, the electrodes in either orientation may be incorporated with a single current collector, such as the anode current collectors as illustrated, although in embodiments the electrodes may be incorporated or positioned along the cathode current collectors. This may facilitate manufacturing where the electrodes may then be incorporated with a single current collector formation. For example, individual cells may be formed and diced, and then when stacked to produce a battery, the cells may be oriented to be rotated from the previous cell, which may allow formation of the grid described above.

In operation, selective sensing or charging may be performed across multiple cells simultaneously. For example, by engaging individual electrodes on every other cell, every third cell, or in some other combination, sensing, charging, or balancing may be performed at numerous locations though battery cell 900 at any time. The methods of sensing and balancing described previously are similarly applicable to battery 900, which may increase operational stability of the battery and individual cells, and may provide improved operation and extended lifetimes compared to conventional technologies.

In the preceding description, for the purposes of explanation, numerous details have been set forth in order to provide an understanding of various embodiments of the present technology. It will be apparent to one skilled in the art, however, that certain embodiments may be practiced without some of these details, or with additional details.

Having disclosed several embodiments, it will be recognized by those of skill in the art that various modifications, alternative constructions, and equivalents may be used without departing from the spirit of the embodiments. Additionally, a number of well-known processes and elements have not been described in order to avoid unnecessarily obscuring the present technology. Accordingly, the above description should not be taken as limiting the scope of the technology.

Where a range of values is provided, it is understood that each intervening value, to the smallest fraction of the unit of the lower limit, unless the context clearly dictates otherwise, between the upper and lower limits of that range is also specifically disclosed. Any narrower range between any stated values or unstated intervening values in a stated range and any other stated or intervening value in that stated range is encompassed. The upper and lower limits of those smaller ranges may independently be included or excluded in the range, and each range where either, neither, or both limits are included in the smaller ranges is also encompassed within the technology, subject to any specifically excluded limit in the stated range. Where the stated range includes one or both of the limits, ranges excluding either or both of those included limits are also included. Where multiple values are provided in a list, any range encompassing or based on any of those values is similarly specifically disclosed.

As used herein and in the appended claims, the singular forms "a", "an", and "the" include plural references unless the context clearly dictates otherwise. Thus, for example, reference to "a material" includes a plurality of such materials, and reference to "the cell" includes reference to one or more cells and equivalents thereof known to those skilled in the art, and so forth.

Also, the words "comprise(s)", "comprising", "contain(s)", "containing", "include(s)", and "including", when used in this specification and in the following claims, are intended to specify the presence of stated features, integers, components, or operations, but they do not preclude the presence or addition of one or more other features, integers, components, operations, acts, or groups.

What is claimed is:
1. A battery cell comprising:
a first current collector;
an anode active material disposed along a first surface of the first current collector;
a plurality of first conductive traces positioned along a second surface of the first current collector opposite the first surface of the first current collector, wherein the plurality of first conductive traces are characterized by a first orientation;

a second current collector;

a cathode active material disposed along a first surface of the second current collector;

a separator positioned between the anode active material and the cathode active material; and a plurality of second conductive traces positioned along a second surface of the second current collector opposite the first surface of the second current collector, wherein the plurality of second conductive traces are characterized by a second orientation substantially orthogonal to the first orientation.

2. The battery cell of claim 1, wherein the plurality of first conductive traces comprise wires extending from a first edge of the first current collector to a second edge of the first current collector opposite the first edge of the first current collector, the wires distributed parallel to each other in the first orientation.

3. The battery cell of claim 2, wherein the plurality of second conductive traces comprise wires extending from a first edge of the second current collector to a second edge of the second current collector opposite the first edge of the second current collector, the wires distributed parallel to each other in the second orientation, whereby the plurality of first conductive traces and the plurality of second conductive traces define a grid through the battery cell.

4. The battery cell of claim 1, wherein a subset of the plurality of first conductive traces comprise at least partially arcuate lines extending from a first edge of the first current collector to a second edge of the first current collector opposite the first edge of the first current collector.

5. The battery cell of claim 1, wherein the first current collector and the second current collector each comprise a polymer current collector.

6. The battery cell of claim 5, wherein an in-plane resistivity of the polymer current collectors are greater than or about 0.005 ohm-meters across a lateral distance of the polymer current collectors.

7. The battery cell of claim 1, further comprising electrical circuitry configured to selectively couple with one or more of the first conductive traces and second conductive traces.

8. The battery cell of claim 7, wherein when the electrical circuitry electronically couples with a first conductive trace and a second conductive trace, the electrical circuitry is configured to determine a voltage of the battery cell at a coordinate position defined through the battery cell between the first conductive trace and the second conductive trace.

9. The battery cell of claim 7, wherein the electrical circuitry is further configured to provide current along a first conductive trace and a second conductive trace to selectively charge a portion of the battery cell at a coordinate position defined through the battery cell between the first conductive trace and the second conductive trace.

10. The battery cell of claim 7, wherein the electrical circuitry is further configured to selectively engage multiple first conductive traces and multiple second conductive traces to distribute charge from a first coordinate position defined through the battery cell between a first conductive trace and a second conductive trace to a second coordinate position defined through the battery cell between an additional first conductive trace and an additional second conductive trace.

11. A multi-cell battery comprising:

a first cell including a first current collector, a first anode, a first cathode, and a second current collector;

a second cell including a third current collector, a second anode, a second cathode, and a fourth current collector;

a plurality of first conductive traces positioned along an exterior surface of the first current collector, wherein the plurality of first conductive traces comprise conductive wires positioned parallel to one another across the exterior surface of the first current collector in a first lateral direction; and a plurality of second conductive traces positioned along an exterior surface of the third current collector and electrically coupled with the second current collector, wherein the plurality of second conductive traces comprise conductive wires positioned parallel to one another across the exterior surface of the third current collector in a second lateral direction orthogonal to the first lateral direction.

12. The multi-cell battery of claim 11, wherein the first current collector and the third current collector each comprise a polymer current collector containing an amount of a conductive material.

13. The multi-cell battery of claim 12, wherein the polymer current collectors are characterized by a resistance greater than or about 0.001 ohm-meters.

14. The multi-cell battery of claim 11, wherein the multi-cell battery is characterized by length and width dimensions greater than 100 mm, and wherein each first conductive trace is spaced from a neighboring first conductive trace by at least about 5 mm.

15. The multi-cell battery of claim 11, wherein when one of the first conductive traces and one of the second conductive traces are coupled with circuitry, a voltage may be determined in a region about an axis through the first cell extending normal to the one of the first conductive traces and the one of the second conductive traces.

16. The multi-cell battery of claim 11, wherein each conductive trace of the plurality of first conductive traces and the plurality of second conductive traces are individually coupled with circuitry configured to provide an amount of current along any one conductive trace of the plurality of first conductive traces and any one conductive trace of the plurality of second conductive traces to selectively charge a region of the first cell about an axis through the first cell extending normal to the one conductive trace of the plurality of first conductive traces and the one conductive trace of the plurality of second conductive traces.

17. A battery cell comprising:

a first polymer current collector;

an anode active material disposed along a first surface of the first polymer current collector;

a first plurality of conductive traces positioned along a length of the first polymer current collector from a first edge of the first polymer current collector to a second edge of the first polymer current collector, wherein the first plurality of conductive traces are disposed parallel to one another;

a second polymer current collector;

a cathode active material disposed along a first surface of the second polymer current collector;

a separator positioned between the anode active material and the cathode active material; and a second plurality of conductive traces positioned along a width of the second polymer current collector from a third edge of the second polymer current collector to a fourth edge of the second polymer current collector, wherein the second plurality of conductive traces are disposed parallel to one another.

18. The battery cell of claim 17, wherein the first plurality of conductive traces and the second plurality of conductive traces comprise one or more of copper, nickel, aluminum, silver, or carbon.

19. The battery cell of claim 17, wherein each conductive trace is characterized by a thickness of less than or about 0.5 mm.

20. The battery cell of claim 17, further comprising control circuitry associated with each plurality of conductive traces and coupleable with each conductive trace individually, the control circuitry configured to measure an electrical potential on a conductive trace or deliver a current along a conductive trace.

* * * * *